(12) United States Patent
Kishi et al.

(10) Patent No.: US 12,736,803 B2
(45) Date of Patent: Sep. 15, 2026

(54) IMAGING UNIT

(71) Applicant: Murata Manufacturing Co., Ltd., Nagaokakyo (JP)

(72) Inventors: Noritaka Kishi, Nagaokakyo (JP); Takahide Nakadoi, Nagaokakyo (JP); Hitoshi Sakaguchi, Nagaokakyo (JP); Yuuki Ishii, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 287 days.

(21) Appl. No.: 18/763,246

(22) Filed: Jul. 3, 2024

(65) Prior Publication Data

US 2024/0361591 A1 Oct. 31, 2024

Related U.S. Application Data

(63) Continuation of application No. PCT/JP2022/039132, filed on Oct. 20, 2022.

(30) Foreign Application Priority Data

Feb. 25, 2022 (JP) ................................. 2022-028249

(51) Int. Cl.
*G02B 27/00* (2006.01)
*B06B 1/06* (2006.01)
*B08B 7/02* (2006.01)

(52) U.S. Cl.
CPC ........ *G02B 27/0006* (2013.01); *B06B 1/0655* (2013.01); *B08B 7/02* (2013.01)

(58) Field of Classification Search
CPC ..... G02B 27/0006; B06B 1/0655; B08B 7/02; G03B 17/02; H04N 23/52; H04N 23/57
See application file for complete search history.

(56) References Cited

U.S. PATENT DOCUMENTS 9,454,003 B1 9/2016 Li
11,979,669 B2 * 5/2024 Kishi .................... B08B 7/0028
(Continued)

FOREIGN PATENT DOCUMENTS

JP 2017170303 A 9/2017
WO 2019181122 A1 9/2019
(Continued)

OTHER PUBLICATIONS

International Search Report in PCT/JP2022/039132, mailed Dec. 27, 2022, 3 pages.

(Continued)

*Primary Examiner* — Collin X Beatty
(74) *Attorney, Agent, or Firm* — Keating & Bennett, LLP

(57) ABSTRACT

An imaging unit includes an outermost layer lens, a housing, a vibrator, a piezoelectric element, an inner layer lens, a fixing portion, an imaging element, an imaging control substrate, and a case. The vibrator vibrates the outermost layer lens held by the housing. The piezoelectric element is provided on at least one surface of the vibrator. The case is joined to the housing and houses at least the imaging element and the imaging control substrate. Wiring electrically connected to the piezoelectric element extends from an inside of the housing so as to pass a plane including a mounting surface of the imaging control substrate on which the imaging element is mounted.

18 Claims, 9 Drawing Sheets

(56) References Cited

U.S. PATENT DOCUMENTS

| | | | |
|---|---|---|---|
| 2021/0325667 | A1 | 10/2021 | Nakadoi |
| 2022/0163751 | A1 | 5/2022 | Park et al. |

FOREIGN PATENT DOCUMENTS

| | | | |
|---|---|---|---|
| WO | 2020197289 | A1 | 10/2020 |
| WO | 2021038942 | A1 | 3/2021 |
| WO | 2021210208 | A1 | 10/2021 |

OTHER PUBLICATIONS

Written Opinion in PCT/JP2022/039132, mailed Dec. 27, 2022, 4 pages.

* cited by examiner

FIG.6

IMAGING UNIT

CROSS REFERENCE TO RELATED APPLICATIONS

This application claims the benefit of priority to Japanese Patent Application No. 2022-028249 filed on Feb. 25, 2022 and is a Continuation Application of PCT Application No. PCT/JP2022/039132 filed on Oct. 20, 2022. The entire contents of each application are hereby incorporated herein by reference.

BACKGROUND OF THE INVENTION

1. Field of the Invention

The present disclosure relates to imaging units.

2. Description of the Related Art

An imaging unit has been provided in a front portion or a rear portion of a vehicle, and images captured by the imaging unit have been used to control a safety device and perform driving support control. Since such an imaging unit is often provided outside a vehicle, foreign matter such as raindrops (water drops), mud, dust, and the like can adhere to a light-transmissive body (protective cover or lens) that covers an outer portion of the imaging unit. When foreign matter adheres to the light-transmissive body, the foreign matter affects an image captured by the imaging unit, and a clear image is not obtained.

Therefore, an imaging unit described in Japanese Unexamined Patent Application Publication No. 2017-170303 or an imaging unit described in U.S. Pat. No. 9,454,003 is provided with a vibrator that vibrates a light-transmissive body so as to remove foreign matter adhering to a surface of the light-transmissive body.

In the imaging unit described in Japanese Unexamined Patent Application Publication No. 2017-170303 or U.S. Pat. No. 9,454,003, a vibrator is provided with a piezoelectric element so as to vibrate a light-transmissive body. Therefore, in order to drive the piezoelectric element, wiring for supplying a control signal (alternating current signal) is required. However, since wiring is provided in an outer side portion of a light-transmissive body in the imaging unit described in Japanese Unexamined Patent Application Publication No. 2017-170303, waterproof treatment needs to be performed for the wiring, and integration of wiring of a piezoelectric element and wiring of an imaging element is difficult.

In addition, since the imaging unit described in U.S. Pat. No. 9,454,003 has a housing provided with a through-hole and wiring extends to the outside through the through-hole, moisture or dust is more likely to enter from the through-hole. In addition, also in the imaging unit described in U.S. Pat. No. 9,454,003, integration of wiring of a piezoelectric element and wiring of an imaging element in the housing is difficult.

SUMMARY OF THE INVENTION

Example embodiments of the present invention provide imaging units each able to integrate wiring of a piezoelectric element and wiring of an imaging element.

An imaging unit according to an example embodiment of the present invention includes a light-transmissive body, a housing, a vibrator, a piezoelectric element, a lens, a fixing portion, an imaging element, a first substrate, and a case. The light-transmissive body transmits light having a predetermined wavelength. The housing holds the light-transmissive body. The vibrator vibrates the light-transmissive body held by the housing. The piezoelectric element is provided on at least one surface of the vibrator. The lens is provided at a position, in the housing, facing the light-transmissive body. The fixing portion fixes the lens in a portion of the housing defining and functioning as a node of vibration by the vibrator. The imaging element is disposed such that the light-transmissive body and the lens are provided in a visual field direction of the imaging element. The first substrate is electrically connected to the imaging element on a surface of the imaging element opposite to a surface in the visual field direction. The case is joined to the housing and houses at least the imaging element and the first substrate. The piezoelectric element is electrically connected to wiring that extends from the inside of the housing to pass a plane including a mounting surface of the first substrate on which the imaging element is mounted.

According to example embodiments of the present invention, in an imaging unit, since wiring electrically connected to a piezoelectric element extends from the inside of a housing so as to pass a plane including a mounting surface of a first substrate on which an imaging element is mounted, integration of wiring of the piezoelectric element and wiring of the imaging element is achieved.

The above and other elements, features, steps, characteristics and advantages of the present invention will become more apparent from the following detailed description of the example embodiments with reference to the attached drawings.

BRIEF DESCRIPTION OF THE DRAWINGS

FIG. 6 is a plan view illustrating a cutout portion provided in a connecting portion.

DETAILED DESCRIPTION OF THE EXAMPLE EMBODIMENTS

Figure 1:
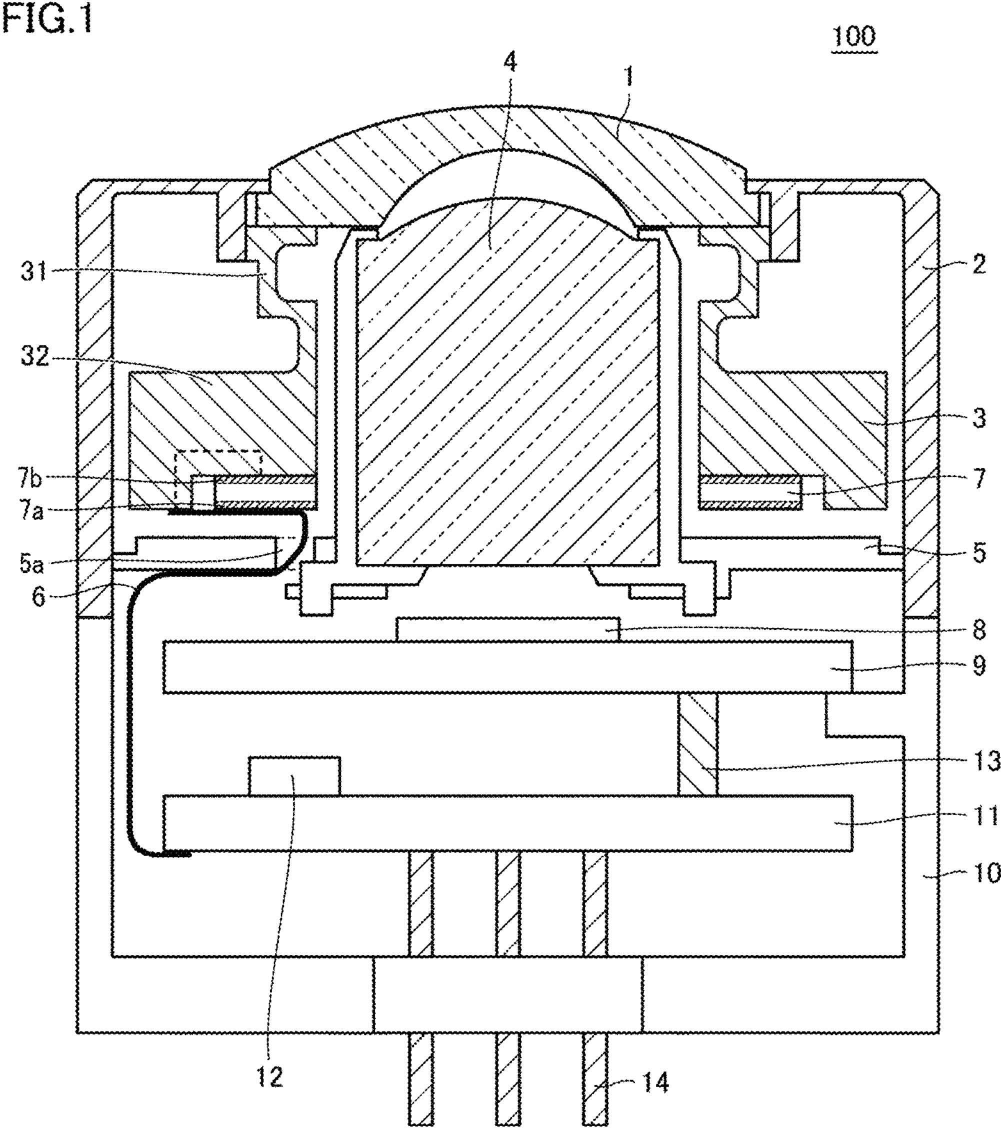
FIG. 1 is a sectional view of an imaging unit according to a first example embodiment of the present invention.

Hereinafter, imaging units according to example embodiments of the present invention will be described in detail with reference to the drawings. The same reference numerals in the drawings denote the same or corresponding portions.

Each of the imaging units described below is applicable to a car-mounted imaging unit, for example, and can vibrate a light-transmissive body (for example, an outermost layer lens) so as to remove foreign matter adhering to a surface of the light-transmissive body. The imaging unit is not limited to being used for a car-mounted imaging unit. For example, the imaging unit is also applicable to a monitoring camera for security, an imaging unit for a drone, and the like.

First Example Embodiment

FIG. 1 is a sectional view of an imaging unit 100 according to a first example embodiment of the present invention. The imaging unit 100 includes an outermost layer lens 1, a housing 2, a vibrator 3, an inner layer lens 4, a fixing portion 5, a piezoelectric element 7, an imaging element 8, an imaging control substrate 9 (a first substrate), a case 10, and a vibration control substrate 11 (a second substrate).

The outermost layer lens 1 is a light-transmissive body that transmits light having a predetermined wavelength (for example, a wavelength of visible light, a wavelength that can be captured by an imaging element, or the like) and is, for example, a convex meniscus lens. In the imaging unit 100, a transparent member such as, for example, a protective cover may be used instead of the outermost layer lens 1. The protective cover is made of glass or resin such as transparent plastic, for example.

An end portion of the outermost layer lens 1 is held by an end portion of the housing 2. The imaging unit 100 is provided with the vibrator 3 at a position in contact with the outermost layer lens 1 so as to vibrate the outermost layer lens 1 held by the housing 2. The housing 2 and the vibrator 3 may be integrated as indicated by a third example embodiment of the present invention described later.

The vibrator 3 has a cylindrical shape, and the inner layer lens 4 is disposed inside the cylinder. The vibrator 3 includes a connecting portion 31 that connects the vibrator 3 to the outermost layer lens 1 (the light-transmissive body) and a vibrating portion 32 provided with the piezoelectric element 7. The connecting portion 31 converts vibration of the piezoelectric element 7 and has a crank shape. On the other hand, the vibrating portion 32 vibrates together with the vibration of the piezoelectric element 7 and is thicker than the connecting portion 31. The connecting portion 31 and the vibrating portion 32 may be integrally provided or separately provided. The piezoelectric element 7 is provided on a surface of the vibrator 3 on a side opposite to a side in contact with the outermost layer lens 1. The piezoelectric element 7 has a hollow cylindrical shape and vibrates by, for example, being polarized in a thickness direction. The piezoelectric element 7 is made of, for example, PZT piezoelectric ceramics. However, other piezoelectric ceramics such as, for example, (K, Na) $NbO_3$ may be used. Moreover, a piezoelectric single crystal such as, for example, $LiTaO_3$ may be used.

The piezoelectric element 7 includes a first electrode 7*a* on a surface opposite to a surface in contact with the vibrator 3 and a second electrode 7*b* on the surface in contact with the vibrator 3. The first electrode 7*a* and the second electrode 7*b* are, for example, Ag. In order to drive the piezoelectric element 7, a control signal (alternating current signal) is supplied to the first electrode 7*a* and the second electrode 7*b*. Therefore, wiring 6 to supply a control signal (alternating current signal) from the vibration control substrate 11 described later is connected to the piezoelectric element 7.

Figure 2:
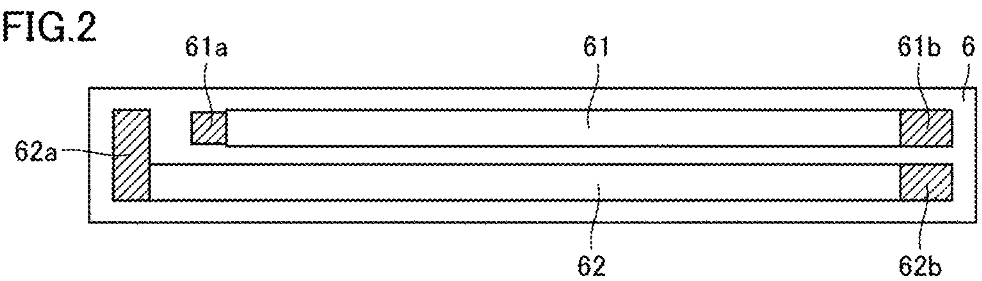
FIG. 2 is a plan view of wiring of a piezoelectric element according to the first example embodiment of the present invention.

FIG. 2 is a plan view of the wiring 6 of the piezoelectric element 7 according to the first example embodiment. The wiring 6 includes a first wire 61 electrically connected to the first electrode 7*a* of the piezoelectric element 7 and a second wire 62 electrically connected to the vibrator 3. As illustrated by a broken line of FIG. 1, the second wire 62 is electrically connected to the second electrode 7*b* of the piezoelectric element 7 through the vibrator 3 made of metal.

Specifically, the wiring 6 is flexible printed circuits (FPC) and is obtained by patterning a flexible electrode or a wire on a flexible sheet, and one end of the first wire 61 includes an electrode 61*a* so as to be electrically connected to the first electrode 7*a*, and one end of the second wire 62 includes an electrode 62*a* so as to be electrically connected to the vibrator 3. In addition, in the wiring 6, another end of the first wire 61 includes an electrode 61*b* so as to be electrically connected to the vibration control substrate 11, and another end of the second wire 62 includes an electrode 62*b* so as to be electrically connected to the vibration control substrate 11.

In order for the first electrode 7*a* of the piezoelectric element 7 to be connected to the vibrator 3 by the wiring 6, which is, for example, FPC, the surface of the first electrode 7*a* and one surface of the vibrator 3 are on the same plane. That is, as illustrated in FIG. 1, the vibrator 3 includes a recess at a position where the piezoelectric element 7 is provided.

The piezoelectric element 7 having a hollow cylindrical shape vibrates in a radial direction (a left and right direction in the figure) by the control signal (alternating current signal) supplied from the wiring 6, the vibration is converted into vibration in a Z direction (an up and down direction in the figure) in the connecting portion 31 of the vibrator 3, and the outermost layer lens 1 vibrates in an optical axis direction. The housing 2 transmits the vibration of the vibrator 3 to the outermost layer lens 1 when a portion (the connecting portion 31) holding the outermost layer lens 1 is elastically deformed like a plate spring, and a portion spaced away from the outermost layer lens 1 becomes a node of the vibration. Here, a node of vibration is a portion whose amplitude is approximately equal to or less than 1/50 of the maximum amplitude of the vibrator 3. Therefore, while displacement becomes the maximum in a central portion of the outermost layer lens 1 by the vibration of the vibrator 3, displacement of the portion spaced away from the outermost layer lens 1 becomes small.

In FIG. 1, the piezoelectric element 7 having a hollow cylindrical shape is provided on the bottom surface of the vibrator 3, but in addition to the above-described piezoelectric element 7, a piezoelectric element may be provided on another surface. Alternatively, a plurality of piezoelectric elements 7 each having a rectangular or substantially rectangular shape may be provided concentrically on the bottom surface of the vibrator 3.

The imaging unit 100 is configured not to transmit vibration of the vibrator 3 to the inner layer lens 4 by fixing the inner layer lens 4 using the fixing portion 5 in a portion of the housing 2 defining and functioning as a node of vibration. Therefore, in the imaging unit 100, deterioration of the image quality is not generated due to the vibration of the vibrator 3. In addition, since the inner layer lens 4 is fixed to the portion of the housing 2 defining and functioning as a node of vibration, the inner layer lens 4 does not attenuate the vibration of the vibrator 3, and performance of removing foreign matter adhering to the outermost layer lens 1 does not deteriorate.

The fixing portion 5 that fixes the inner layer lens 4 to the housing 2 preferably has a mechanical quality factor Qm smaller than that of the housing 2. When the mechanical quality factor Qm of the fixing portion 5 is made smaller than that of the housing 2, the vibration of the vibrator 3 is less likely to be transmitted to the inner layer lens 4 through the fixing portion 5. Specifically, the fixing portion 5 is preferably made of resin, for example.

The inner layer lens 4 has a configuration in which an inner layer lens barrel 4*a* holds a plurality of lenses. The inner layer lens barrel 4*a* is a holding portion of the inner layer lens 4. Since the plurality of lenses defining the inner layer lens 4 is held by the inner layer lens barrel 4*a* after alignment of the lenses is adjusted, alignment of the individual lenses does not have to be adjusted when the lenses are mounted in the imaging unit 100.

The imaging unit 100 includes the imaging element 8 disposed such that the outermost layer lens 1 and the inner layer lens 4 are provided in a visual field direction of the imaging element 8. The imaging element 8 is an image sensor such as a charge coupled device (CCD) or a complementary metal-oxide-semiconductor (CMOS) sensor, for example, and is mounted on the imaging control substrate 9, which is an imaging element mounting substrate.

The imaging unit 100 includes the vibration control substrate 11 that is provided farther in a direction opposite to the visual field direction than is the imaging control substrate 9 and on which a control circuit 12 that supplies a control signal (alternating current signal) for the piezoelectric element 7 is mounted. The imaging control substrate 9 and the vibration control substrate 11 are electrically connected with an inter-substrate connector 13 interposed therebetween. The control circuit 12 is a semiconductor element that generates a control signal (alternating current signal) for the piezoelectric element 7, such as a general-purpose integrated circuit (IC) or an application specific integrated circuit (ASIC), for example.

As illustrated in FIG. 1, the wiring 6 extends from the inside of the housing 2 through a through-hole 5*a* provided in the fixing portion 5 so as to pass a plane including a mounting surface of the imaging control substrate 9 on which the imaging element 8 is mounted. Moreover, the wiring 6 is electrically connected to the vibration control substrate 11 on a surface of the vibration control substrate 11 opposite to a surface facing the imaging control substrate 9. Specifically, the wiring 6 extending from the through-hole 5*a* passes between the imaging control substrate 9 and the case 10 and between the vibration control substrate 11 and the case 10.

In the imaging unit 100, since the wiring 6 extends from the inside of the housing 2 so as to pass a plane including the mounting surface of the imaging control substrate 9 on which the imaging element 8 is mounted, the wiring 6 and wiring of the imaging element 8 can be integrated and extend to the outside of the case 10 from a terminal electrode 14 connected to the vibration control substrate 11. In addition, without providing a through-hole in the housing 2, the wiring 6 of the piezoelectric element 7 extends from the inside of the housing 2 so as to pass a plane including the mounting surface of the imaging control substrate 9 on which the imaging element 8 is mounted, as a result of which waterproof treatment for the wiring 6 does not have to be performed.

After alignment between the imaging element 8 mounted on the imaging control substrate 9 and the inner layer lens 4 is adjusted, the imaging control substrate 9 is fixed to the fixing portion 5 with an adhesive, and the case 10 and the housing 2 are joined so that the imaging unit 100 is completed. A portion of the housing 2 joined to the case 10 is preferably a portion defining and functioning as a node of vibration of the vibrator 3. FIGS. 3 and 4 are schematic views for explaining an example of an assembly method of the imaging unit 100 according to the first example embodiment.

Figure 3A:
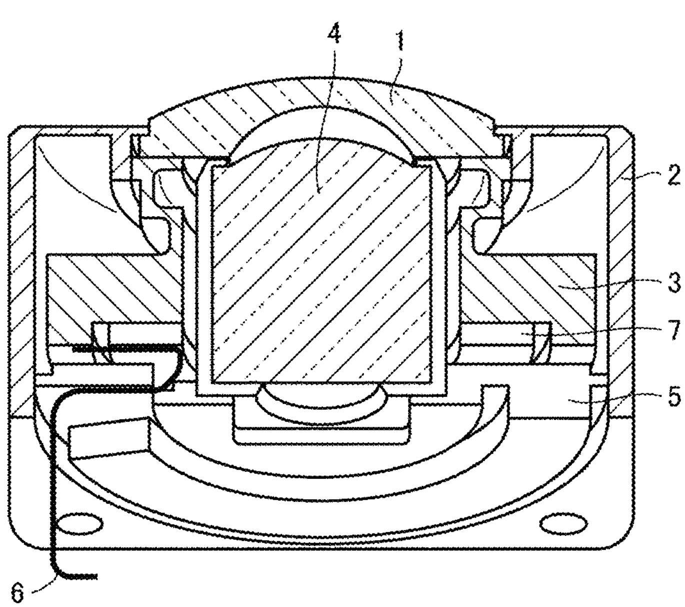
FIGS. 3A and 3B are schematic views for explaining an assembly method of the imaging unit according to the first example embodiment of the present invention.
Figure 3B:
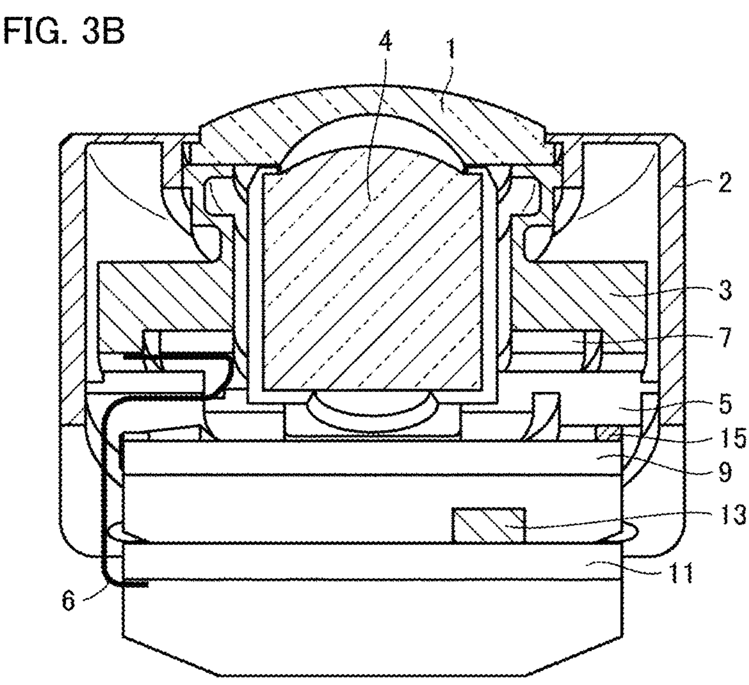

In FIGS. 3A and 3B, when the direction of the outermost layer lens 1 viewed from the inner layer lens 4 is upward, and the direction of the fixing portion 5 is downward, a lower side of the fixing portion 5 that fixes the inner layer lens barrel 4*a* has a recessed shape that matches or substantially matches the position of the imaging element 8 as illustrated in FIG. 3A.

Figure 4A:
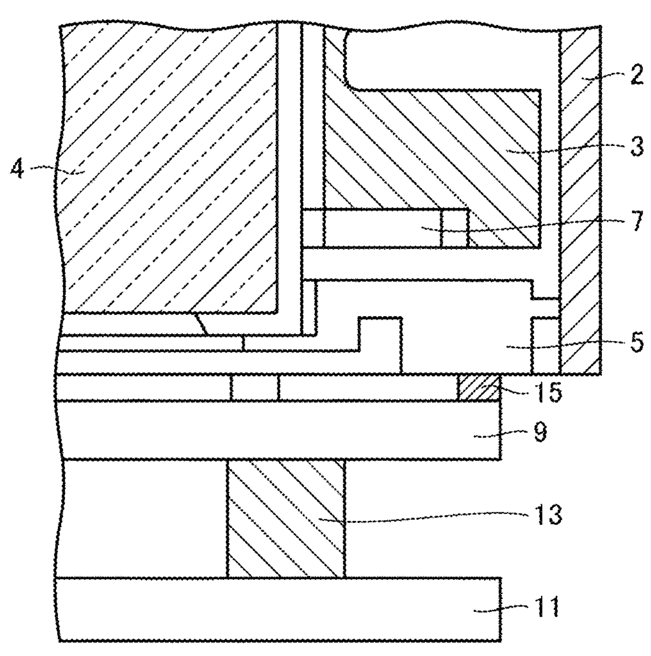
FIGS. 4A and 4B are schematic views for explaining the assembly method of the imaging unit according to the first example embodiment of the present invention.

As illustrated in FIG. 3B, the imaging control substrate 9 is fixed to the fixing portion 5 with an adhesive 15 using the recessed shape of the fixing portion 5 as a guide. A mechanism that adjusts the position of the imaging control substrate 9 with respect to the fixing portion 5 using the thickness of the adhesive 15 may be provided so that the position of the imaging element 8 matches or substantially matches the focal position of the inner layer lens 4. As illustrated in FIG. 4A, the position of the imaging control substrate 9 and the position of the fixing portion 5 are adjusted in a state in which the adhesive 15 is applied, and the adhesive 15 is irradiated with ultraviolet light at the position so as to be cured and fix the position of the imaging control substrate 9 with respect to the fixing portion 5. The above-described technique is a common technique to fix the imaging control substrate 9 to the fixing portion 5, but the technique is not limited thereto, and other techniques may be used.

Only the imaging control substrate 9 may be first fixed to the fixing portion 5 and then the vibration control substrate 11 may be connected to the imaging control substrate 9, or the imaging control substrate 9 to which the vibration control substrate 11 is connected may be fixed to the fixing portion 5. After the imaging control substrate 9 and the vibration control substrate 11 are fixed to the fixing portion 5, the wiring 6 from the piezoelectric element 7 is connected to the vibration control substrate 11. The method of connecting the wiring 6 to the vibration control substrate 11 includes, for example, a method of pressure-boding the wiring 6 to the vibration control substrate 11 using a conductive adhesive sheet. Since the vibration control substrate 11 is electrically connected to the wiring 6 on the surface of the vibration control substrate 11 opposite to the surface facing the imaging control substrate 9, the connecting operation is easily performed even after the imaging control substrate 9 and the vibration control substrate 11 are fixed to the fixing portion 5.

Figure 4B:
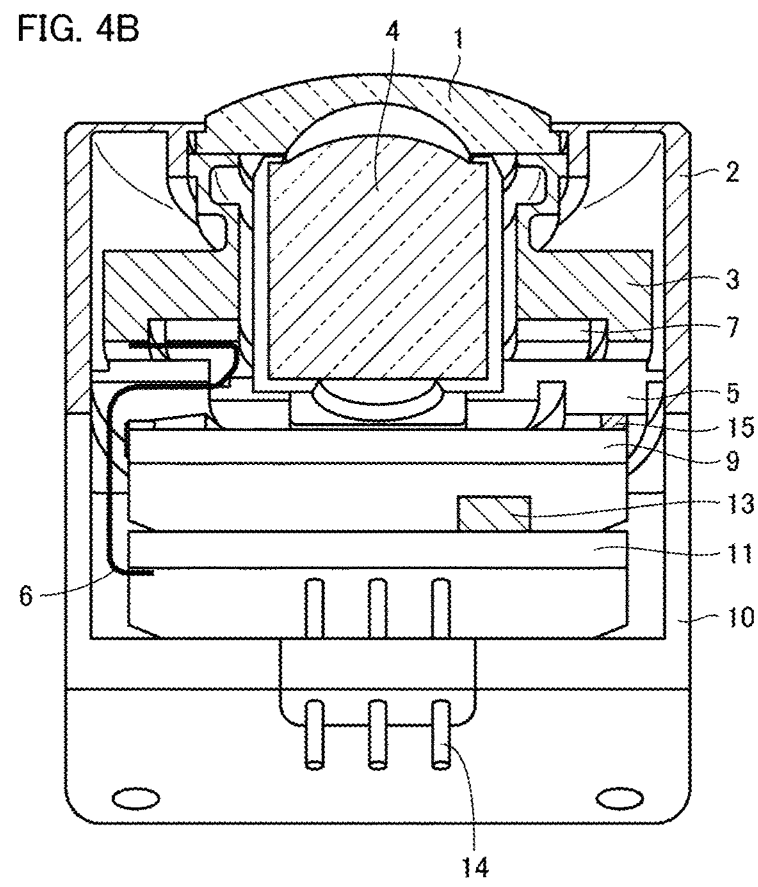

Next, as illustrated in FIG. 4B, the terminal electrode 14 is attached to the vibration control substrate 11, and the case 10 and the housing 2 are joined together. The case 10 and the housing 2 can be fixed with screws or an adhesive, for example. When an O-ring (not illustrated) or the like is provided between the case 10 and the housing 2, waterproof performance between the case 10 and the housing 2 can be improved.

As described above, the imaging unit 100 according to the first example embodiment includes the outermost layer lens 1 (the light-transmissive body), the housing 2, the vibrator 3, the piezoelectric element 7, the inner layer lens 4 (a lens), the fixing portion 5, the imaging element 8, the imaging control substrate 9 (the first substrate), and the case 10. The outermost layer lens 1 transmits light having a predetermined wavelength. The housing 2 holds the outermost layer lens 1. The vibrator 3 vibrates the outermost layer lens 1 held by the housing 2. The piezoelectric element 7 is provided on at least one surface of the vibrator 3. The inner layer lens 4 is provided at a position, in the housing 2, facing the outermost layer lens 1. The fixing portion 5 fixes the inner layer lens 4 in a portion of the housing 2 defining and functioning as a node of vibration by the vibrator 3. The imaging element 8 is disposed such that the outermost layer lens 1 and the inner layer lens 4 are provided in a visual field direction of the imaging element 8. The imaging control substrate 9 is electrically connected to the imaging element 8 on a surface of the imaging element 8 opposite to a surface in the visual field direction. The case 10 is joined to the housing 2 and houses at least the imaging element 8 and the imaging control substrate 9. The wiring 6 electrically connected to the piezoelectric element 7 extends from the inside of the housing 2 so as to pass a plane including a mounting surface of the imaging control substrate 9 on which the imaging element 8 is mounted.

As a result, in the imaging unit 100 according to the first example embodiment, since the wiring 6 electrically connected to the piezoelectric element 7 extends from the inside of the housing 2 so as to pass a plane including the mounting surface of the imaging control substrate 9 on which the imaging element 8 is mounted, integration of the wiring 6 of the piezoelectric element 7 and the wiring of the imaging element 8 is possible.

The imaging unit 100 preferably further includes the vibration control substrate 11 (the second substrate) that is provided farther in a direction opposite to the visual field direction than is the imaging control substrate 9 and on which the control circuit 12 that supplies a control signal for the piezoelectric element 7 is mounted, and the vibration control substrate 11 and the wiring 6 are preferably electrically connected. As a result, in the imaging unit 100, the control circuit 12 that supplies a control signal for the piezoelectric element 7 can be integrated. The imaging unit 100 does not have to include the vibration control substrate 11, and the control circuit 12 that supplies a control signal for the piezoelectric element 7 may be provided outside the imaging unit 100. In addition, regardless of whether the vibration control substrate 11 is included or not, the wiring 6 may be connected to the imaging control substrate 9.

The wiring 6 is preferably electrically connected to the vibration control substrate 11 on the surface of the vibration control substrate 11 opposite to the surface facing the imaging control substrate 9. As a result, the operation of connecting the wiring 6 to the vibration control substrate 11 is easily performed even after the imaging control substrate 9 and the vibration control substrate 11 are fixed to the fixing portion 5. When the vibration control substrate 11 is not included, the wiring 6 is preferably electrically connected to the imaging control substrate 9 on the surface of the imaging control substrate 9 opposite to the surface on which the imaging element 8 is mounted. Even when the vibration control substrate 11 is included, in configuration in which the imaging control substrate 9 and the vibration control substrate 11 are not simultaneously fixed to the fixing portion 5, the wiring 6 may be electrically connected to the imaging control substrate 9 on the surface of the imaging control substrate 9 opposite to the surface on which the imaging element 8 is mounted.

The fixing portion 5 preferably includes the through-hole 5*a* through which the wiring 6 passes. As a result, even when the housing 2 is not provided with a through-hole, the wiring 6 can extend to the imaging control substrate 9 side.

The imaging control substrate 9 is preferably joined to the fixing portion 5 with the adhesive 15. As a result, alignment between the imaging element 8 and the inner layer lens 4 can be easily adjusted.

The wiring 6 preferably includes the first wire 61 electrically connected to the first electrode 7*a* of the piezoelectric element 7 and the second wire 62 electrically connected to the vibrator 3, and the second wire 62 is preferably electrically connected, through the vibrator 3, to the second electrode 7*b* of the piezoelectric element 7 in contact with the vibrator 3. As a result, a control signal (alternating current signal) can be supplied to the piezoelectric element 7 by the wiring 6.

Second Example Embodiment

In the imaging unit 100 according to the first example embodiment, the wiring 6 extends from the inside of the housing 2 through the through-hole 5*a* provided in the fixing portion 5 so as to pass a plane including the mounting surface of the imaging control substrate 9 on which the imaging element 8 is mounted. The configuration in which the wiring 6 extends to the imaging control substrate 9 side is not limited thereto. In an imaging unit according to a second example embodiment of the present invention, a configuration in which the wiring 6 extends to the imaging control substrate 9 side through a cutout portion provided in the housing will be described.

Figure 5:
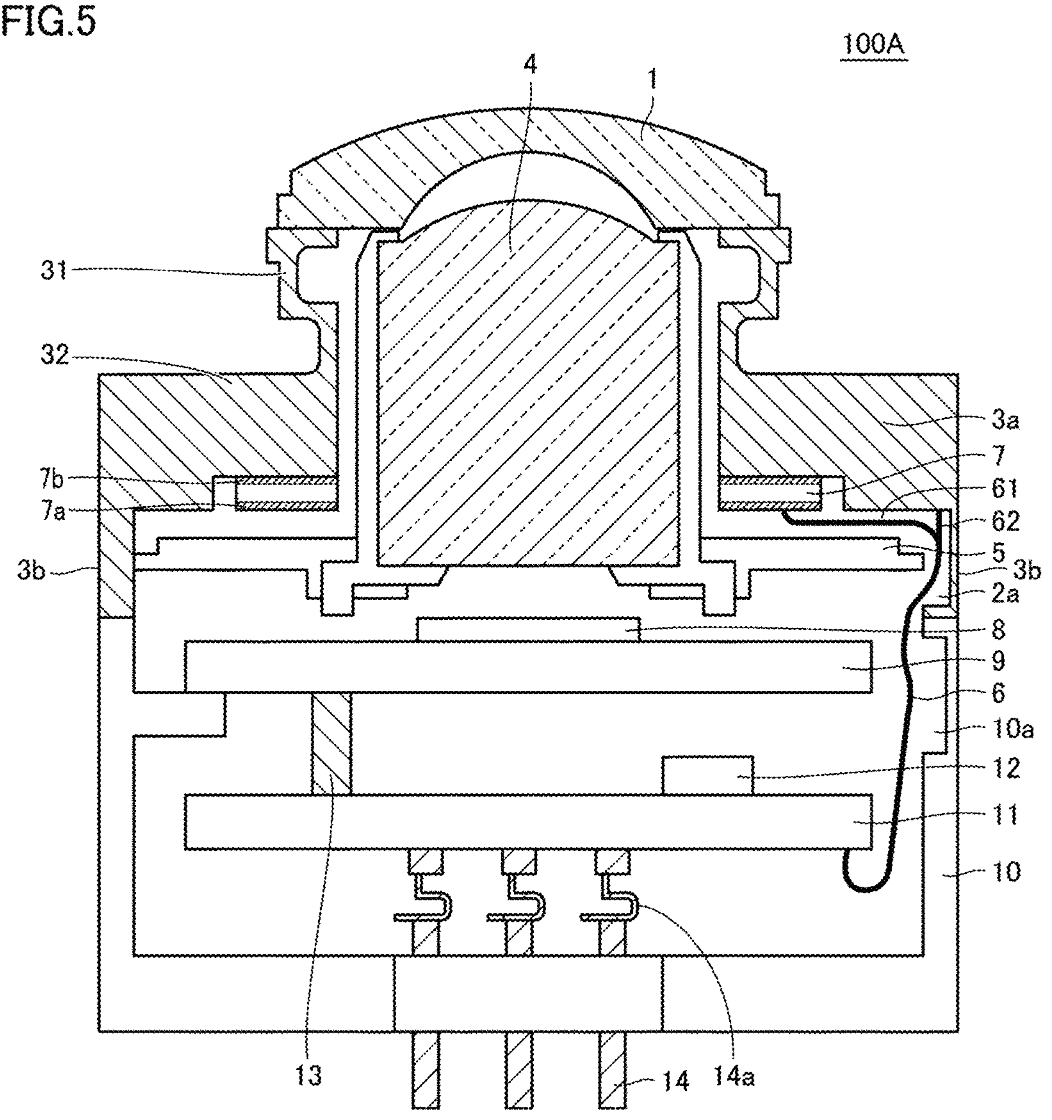
FIG. 5 is a sectional view of an imaging unit according to a second example embodiment of the present invention.

FIG. 5 is a sectional view of an imaging unit 100A according to the second example embodiment. In the imaging unit 100A illustrated in FIG. 5, the same or similar elements to those of the imaging unit 100 according to the first example embodiment are denoted by the same reference numerals, and description thereof will not be repeated.

In the imaging unit 100A according to the second example embodiment, a vibrator 3*a* holds the outermost layer lens 1 and also vibrates the outermost layer lens 1. That is, the vibrator 3*a* has a configuration in which the housing 2 and the vibrator 3 illustrated in FIG. 1 are integrated. In the imaging unit 100A, the housing 2 and the vibrator 3 may be separated as illustrated in FIG. 1.

The vibrator 3*a* includes the piezoelectric element 7 on a surface opposite to a surface in contact with the outermost layer lens 1. The piezoelectric element 7 has a hollow cylindrical shape and vibrates by, for example, being polarized in a thickness direction. The piezoelectric element 7 includes the first electrode 7*a* on a surface opposite to a surface in contact with the vibrator 3*a* and the second electrode 7*b* on the surface in contact with the vibrator 3*a*.

The wiring 6 branches on the way into the first wire 61 electrically connected to the first electrode 7*a* of the piezoelectric element 7 and the second wire 62 electrically connected to the vibrator 3*a*. The second wire 62 is electrically connected to the second electrode 7*b* of the piezoelectric element 7 through the vibrator 3*a*.

When the piezoelectric element 7 vibrates in an optical axis direction by a control signal (alternating current signal) supplied from the wiring 6, the vibrator 3*a* vibrates the outermost layer lens 1 in the optical axis direction. While displacement becomes a maximum in a central portion of the outermost layer lens 1 by the vibration of the vibrator 3*a*, displacement of a connecting portion 3*b* connected to the fixing portion 5 spaced away from the outermost layer lens 1 becomes small. The connecting portion 3*b* is a portion of the vibrator 3*a* and is configured as a portion of the housing connected to an end portion of the fixing portion 5.

Figure 6:
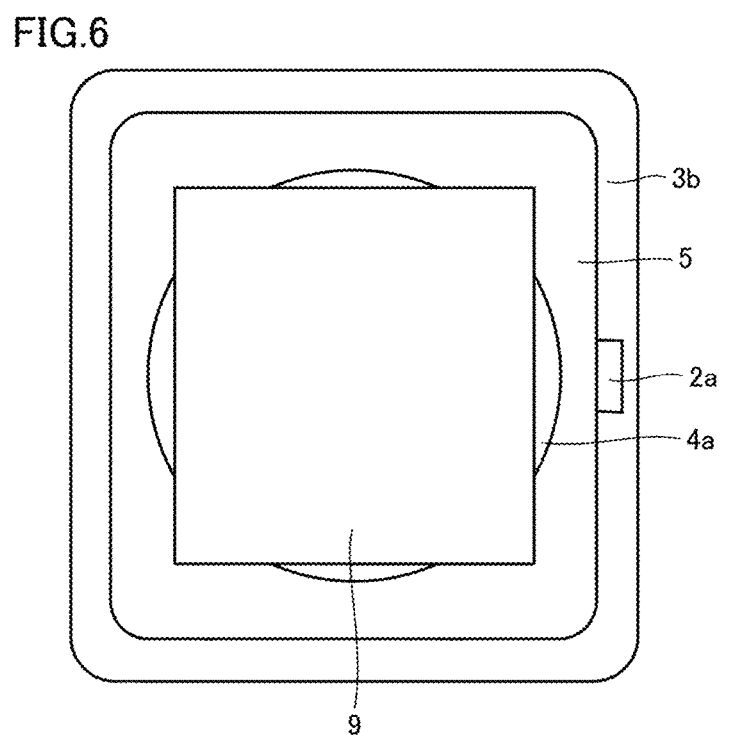

In the imaging unit 100A, the connecting portion 3*b* in which displacement by the vibration of the vibrator 3*a* includes a cutout portion 2*a* through which the wiring 6 extends. As a result, even without providing a through-hole in the vibrator 3*a*, the wiring 6 can extend to the imaging control substrate 9 side. FIG. 6 is a plan view illustrating the cutout portion 2*a* provided in the connecting portion 3*b*. The cutout portion 2*a* may be provided in the fixing portion 5, instead of being provided in the connecting portion 3*b* (a portion of the housing connected to an end portion of the fixing portion 5) connected to the fixing portion 5.

As illustrated in FIG. 5, the wiring 6 extends from the inside of the vibrator 3*a* defining the housing through the cutout portion 2*a* so as to pass a plane including the mounting surface of the imaging control substrate 9 on which the imaging element 8 is mounted. Moreover, the wiring 6 is electrically connected to the vibration control substrate 11 on the surface of the vibration control substrate 11 opposite to the surface facing the imaging control substrate 9. The case 10 includes a groove portion 10*a* at a position corresponding to the imaging control substrate 9 so that the wiring 6 easily extends to the vibration control substrate 11 side by passing between the imaging control substrate 9 and the case 10.

In addition, the vibration control substrate 11 includes a plate spring 14*a* electrically connected to the terminal electrode 14 provided in the case 10. Since the plate spring 14*a* is provided in the vibration control substrate 11, only through joining of the vibrator 3*a* defining the housing to the case 10, the plate spring 14*a* and the terminal electrode 14 come into contact with each other and can be electrically connected.

When the imaging unit 100A is assembled, first, alignment between the fixing portion 5 from which the wiring 6 extends through the cutout portion 2*a* and the imaging control substrate 9 on which the imaging element 8 is mounted is adjusted, and then the fixing portion 5 is bonded to the imaging control substrate 9. Next, the wiring 6 is caused to pass between the imaging control substrate 9 and the case 10 and between the vibration control substrate 11 and the case 10 and is connected to a back surface of the vibration control substrate 11. Here, the back surface of the vibration control substrate 11 is a surface opposite to the surface facing the imaging control substrate 9.

In addition, the case 10 to which the terminal electrode 14 is attached is attached to the vibrator 3*a*. At this time, the back surface of the vibration control substrate 11 includes the plate spring 14*a*, and the plate spring 14*a* and the terminal electrode 14 come into contact with each other so as to be electrically connected. As a result, the wiring 6 of the piezoelectric element 7 and the wiring of the imaging element 8 can be integrated. The plate spring 14*a* may be provided at a leading end of the terminal electrode 14, instead of being provided on the back surface of the vibration control substrate 11.

As described above, in the imaging unit 100A according to the second example embodiment, the fixing portion 5 or the connecting portion 3*b* (a portion of the housing connected to the fixing portion 5) includes the cutout portion 2*a* through which the wiring 6 passes. As a result, the wiring 6 easily extends to the imaging control substrate 9 side through the cutout portion 2*a*.

Moreover, the case 10 preferably includes, at a position corresponding to the imaging control substrate 9, the groove portion 10*a* through which the wiring 6 passes. As a result, the wiring 6 passes through the groove portion 10*a*, such that the wiring 6 easily extends to the vibration control substrate 11 side.

In addition, the housing and the vibrator are preferably integrally provided into the vibrator 3*a*. As a result, the housing does not have to be manufactured separately, and the manufacturing costs can be reduced.

Third Example Embodiment

In the first example embodiment, the configuration in which the wiring 6 extending into the case 10 is electrically connected to the vibration control substrate 11 in the case 10 has been described. However, when the case in which the imaging control substrate and the vibration control substrate are incorporated in advance and the housing including the vibrator are joined to be assembled, it is difficult to electrically connect the vibration control substrate inside the case to the wiring from the vibrator.

Figure 7:
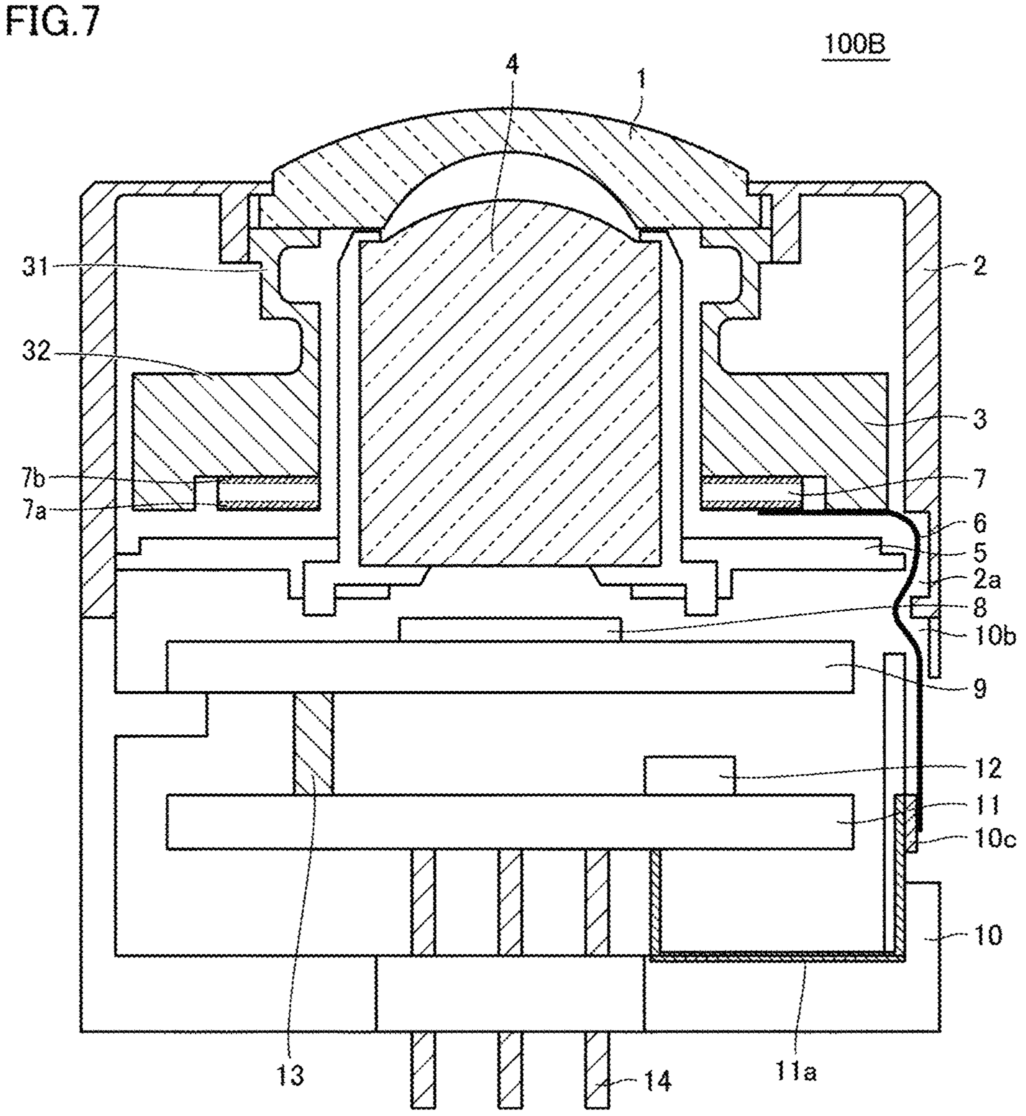
FIG. 7 is sectional view of an imaging unit according to a third example embodiment of the present invention.

Therefore, in a third example embodiment of the present invention, an imaging unit in which the wiring from the vibrator first extends to the outside of the case, and then the vibration control substrate and the wiring from the vibrator are electrically connected outside the case will be described. FIG. 7 is a sectional view of an imaging unit 100B according to the third example embodiment. In the imaging unit 100B illustrated in FIG. 7, the same or similar elements to those of the imaging unit 100 according to the first example embodiment are denoted by the same reference numerals, and description thereof will not be repeated.

As illustrated in FIG. 7, in the imaging unit 100B, the wiring 6, which extends into the housing 2 through the cutout portion 2*a* provided in the housing 2, first extends to the outside of the case 10 through a slit 10*b* provided in the case 10. The wiring 6 extending from the slit 10*b* is electrically connected to a terminal 10*c* provided on an outer surface of the case 10. The terminal 10*c* is electrically connected to the vibration control substrate 11 by wiring 11*a* passing inside the case 10.

The case 10 including the slit 10*b* and the terminal 10*c* is manufactured by, for example, insert molding. The vibration control substrate 11 and the imaging control substrate 9 are incorporated in the manufactured case 10 so that the terminal 10*c* is electrically connected to the vibration control substrate 11, the terminal electrode 14, and the like. The wiring 6 from the vibrator 3 extends to the outside of the case 10 through the slit 10*b*. After alignment between the imaging element 8 and the inner layer lens 4 is adjusted as needed, the case 10 and the housing 2 including the vibrator 3 are joined with an adhesive.

Figure 8:
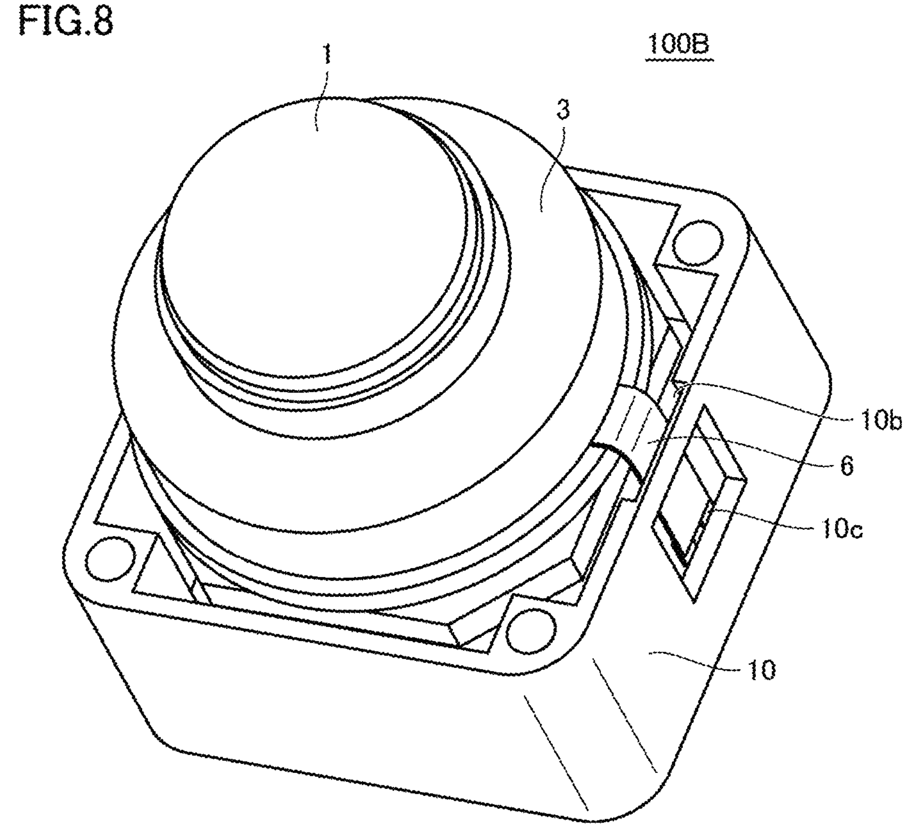
FIG. 8 is a perspective view of an imaging unit provided with a slit, in a case, through which wiring extends.

FIG. 8 is a perspective view of the imaging unit 100B in which the case 10 includes the slit 10*b* through which the wiring 6 extends. For easy understanding, in the imaging unit 100B illustrated in FIG. 8, a portion of the housing 2 is omitted. The wiring 6 extending to the outside of the case 10 is electrically connected to the terminal 10*c* provided on the outer surface of the case 10 by a method such as, for example, pressure-bonding. Since the connecting portion between the wiring 6 and the terminal 10*c* is outside the case 10, the portion is covered with, for example, a lid or resin for waterproof treatment.

As described above, in the imaging unit 100B according to the third example embodiment, the case 10 includes the slit 10*b* through which the wiring 6 extends to the outside of the case 10 and the terminal 10*c* electrically connected to the wiring 6 extending from the slit 10*b*. As a result, when alignment between the imaging control substrate 9 included in the case 10 in advance and the inner layer lens 4 is adjusted, the alignment can be adjusted without causing concerns about the routing of the wiring 6 from the vibrator 3. In addition, when the connecting portion including the slit 10*b* between the wiring 6 and the terminal 10*c* is covered by a lid or the like, a leak path is not generated by the slit 10*b*, such that highly airtight and liquid-tight waterproof treatment can be performed.

Fourth Example Embodiment

In the imaging unit 100 according to the first example embodiment, the wiring 6 extends from the inside of the housing 2 through the through-hole 5*a* provided in the fixing portion 5 so as to pass a plane including the mounting surface of the imaging control substrate 9 on which the imaging element 8 is mounted. In an imaging unit according to a fourth example embodiment of the present invention, instead of a configuration in which the wiring 6 directly extends so as to pass a plane including the mounting surface of the imaging control substrate 9, a configuration in which the wiring 6 indirectly extends using a connector will be described.

Figure 9:
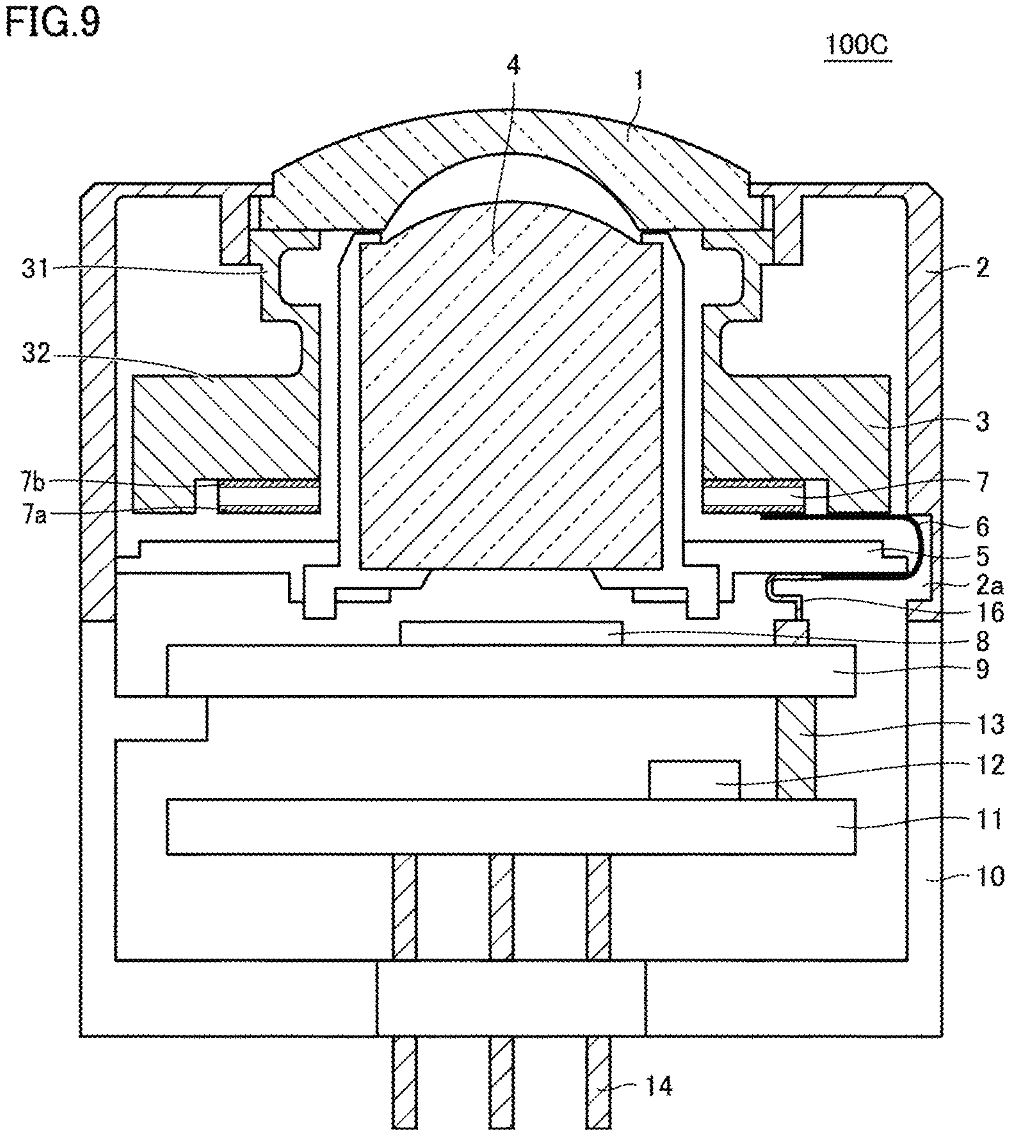
FIG. 9 is a sectional view of an imaging unit according to a fourth example embodiment of the present invention.

FIG. 9 is a sectional view of an imaging unit 100C according to the fourth example embodiment. In the imaging unit 100C illustrated in FIG. 9, the same or similar elements to those of the imaging unit 100 according to the first example embodiment are denoted by the same reference numerals, and description thereof will not be repeated.

In the imaging unit 100C, the imaging control substrate 9 includes a spring connector 16 (a first connector) electrically connected to the wiring 6 and the inter-substrate connector 13 (a second connector) electrically connected to the vibration control substrate 11. The wiring 6 extends through the spring connector 16 and the inter-substrate connector 13 so as to pass a plane including the mounting surface of the imaging control substrate 9 and is electrically connected to the vibration control substrate 11.

The spring connector 16 having a plate spring shape is provided on the imaging control substrate 9 on which the imaging element 8 is mounted and is brought into contact with the wiring 6 extending to the back surface of the fixing portion 5 or inner layer lens barrel 4*a* so as to be electrically connected to the wiring 6. Here, the back surface of the fixing portion 5 or inner layer lens barrel 4*a* is a surface on a side facing the imaging control substrate 9. The spring connector 16 is electrically connected to the inter-substrate connector 13 through a through-hole provided in the imaging control substrate 9. Therefore, the piezoelectric element 7 is electrically connected to the vibration control substrate 11 through the spring connector 16 and the inter-substrate connector 13.

Figure 10:
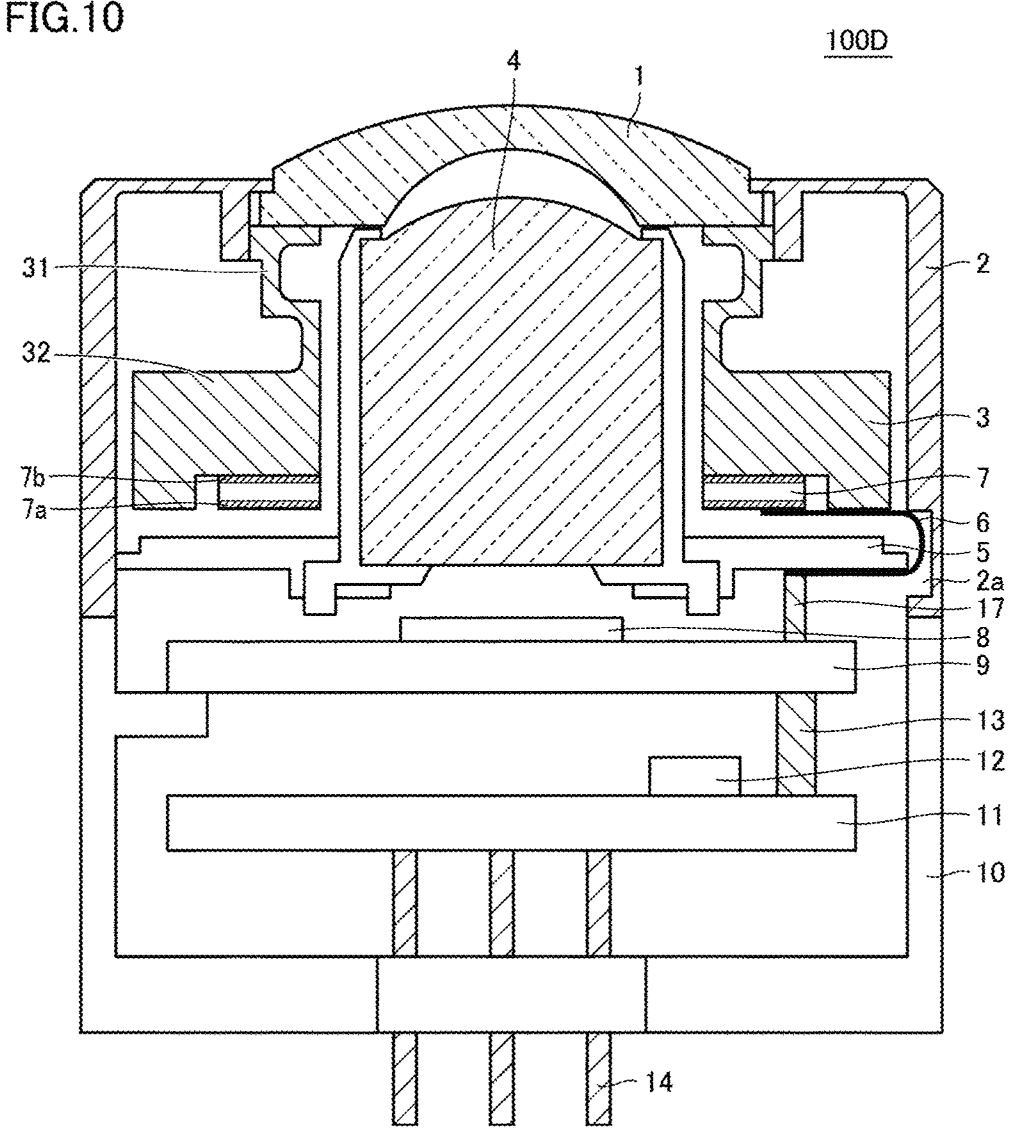
FIG. 10 is a sectional view of an imaging unit according to a modification of the fourth example embodiment of the present invention.

Next, FIG. 10 is a sectional view of an imaging unit 100D according to a modification of the fourth example embodiment. In the imaging unit 100D illustrated in FIG. 10, the same or similar elements to those of the imaging unit 100 according to the first example embodiment are denoted by the same reference numerals, and description thereof will not be repeated.

In the imaging unit 100D, the imaging control substrate 9 includes a through-hole connector 17 (the first connector) electrically connected to the wiring 6 and the inter-substrate connector 13 (the second connector) electrically connected to the vibration control substrate 11. The wiring 6 extends through the through-hole connector 17 and the inter-substrate connector 13 so as to pass a plane including the mounting surface of the imaging control substrate 9 and is electrically connected to the vibration control substrate 11.

The imaging control substrate 9 on which the imaging element 8 is mounted is provided with a through-hole, the through-hole connector 17 having a needle shape is inserted into the through-hole, and the wiring 6 extending to the back surface of the fixing portion 5 or inner layer lens barrel 4*a* is brought into contact with the through-hole connector 17 so as to be electrically connected. The through-hole connector 17 is also electrically connected to the inter-substrate connector 13 through the through-hole provided in the imaging control substrate 9. Therefore, the piezoelectric element 7 is electrically connected to the vibration control substrate 11 through the wiring 6, the through-hole connector 17, and the inter-substrate connector 13.

As described above, in the imaging units 100C and 100D according to the fourth example embodiment, the imaging control substrate 9 includes the spring connector 16 or the through-hole connector 17 electrically connected to the wiring 6, and the inter-substrate connector 13 electrically connected to the vibration control substrate 11. The wiring 6 extends through the spring connector 16 or the through-hole connector 17 and the inter-substrate connector 13 so as to pass a plane including the mounting surface of the imaging control substrate 9 and is electrically connected to the vibration control substrate 11. As a result, in the imaging units 100C and 100D, integration of the wiring 6 of the piezoelectric element 7 and the wiring of the imaging element 8 is possible.

Other Modifications

The imaging units 100 and 100A to 100D according to the above-described example embodiments may include, for example, a camera, LiDAR, Radar, or the like. In addition, a plurality of imaging units may be arranged in sequence.

The imaging units 100 and 100A to 100D according to the above-described example embodiments have configurations in which the imaging control substrate 9 and the vibration control substrate 11 are incorporated in the case 10. However, the imaging units 100 and 100A to 100D may have a configuration in which the vibration control substrate 11 is not provided, and only the imaging control substrate 9 is provided in the case 10. In this case, a configuration in which the control circuit 12 of the vibration control substrate 11 is mounted on the imaging control substrate 9 and the vibration control substrate 11 is unnecessary or a configuration in which the vibration control substrate 11 is provided outside the case 10 may be used.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An imaging unit comprising:

a light-transmissive body to transmit light having a predetermined wavelength;

a housing to hold the light-transmissive body;

a vibrator to vibrate the light-transmissive body held by the housing;

a piezoelectric element provided on at least one surface of the vibrator;

a lens provided at a position, in the housing, facing the light-transmissive body;

a fixing portion to fix the lens in a portion of the housing defining and functioning as a node of vibration by the vibrator;

an imaging element positioned such that the light-transmissive body and the lens are provided in a visual field direction of the imaging element;

a first substrate electrically connected to the imaging element on a surface of the imaging element opposite to a surface in the visual field direction; and a case joined to the housing and in which at least the imaging element and the first substrate are housed; wherein the piezoelectric element is electrically connected to wiring extending from an inside of the housing to pass a plane including a mounting surface of the first substrate on which the imaging element is mounted.

2. The imaging unit according to claim 1, further comprising:

a second substrate provided farther in a direction opposite to the visual field direction than the first substrate and on which a control circuit to supply a control signal for the piezoelectric element is mounted; wherein the second substrate and the wiring are electrically connected.

3. The imaging unit according to claim 2, wherein the wiring is electrically connected to the second substrate on a surface of the second substrate opposite to a surface facing the first substrate.

4. The imaging unit according to claim 1, wherein the wiring is electrically connected to the first substrate on a surface of the first substrate opposite to the mounting surface.

5. The imaging unit according to claim 1, wherein the fixing portion includes a through-hole through which the wiring passes.

6. The imaging unit according to claim 1, wherein the fixing portion or a portion of the housing connected to the fixing portion includes a cutout portion through which the wiring passes.

7. The imaging unit according to claim 1, wherein the case includes, at a position corresponding to the first substrate, a groove portion through which the wiring passes.

8. The imaging unit according to claim 1, wherein the case includes a slit through which the wiring extends to an outside of the case and a terminal electrically connected to the wiring extending from the slit.

9. The imaging unit according to claim 1, wherein the first substrate is joined to the fixing portion with an adhesive.

10. The imaging unit according to claim 1, wherein the housing and the vibrator are integrally provided.

11. The imaging unit according to claim 2, wherein the first substrate includes a first connector electrically connected to the wiring and a second connector electrically connected to the second substrate; and the wiring extends through the first connector and the second connector to pass the plane including the mounting surface and is electrically connected to the second substrate.

12. The imaging unit according to claim 1, wherein the wiring includes a first wire electrically connected to a first electrode of the piezoelectric element and a second wire electrically connected to the vibrator; and the second wire is electrically connected, through the vibrator, to a second electrode of the piezoelectric element in contact with the vibrator.

13. The imaging unit according to claim 1, wherein the wiring includes a first wire electrically connected to a first electrode of the piezoelectric element and a second wire electrically connected to the housing.

14. The imaging unit according to claim 1, wherein the light-transmissive body in a convex meniscus lens.

15. The imaging unit according to claim 1, wherein a protective cover made of glass or resin is provided on the light-transmissive body.

16. The imaging unit according to claim 1, wherein the vibrator has a cylindrical shape.

17. The imaging unit according to claim 1, wherein the piezoelectric element has a hollow cylindrical shape and is polarized in a thickness direction.

18. The imaging unit according to claim 12, wherein each of the first and second electrodes includes Ag.

* * * * *